(12) United States Patent
Ishida et al.

(10) Patent No.: US 11,752,721 B2
(45) Date of Patent: Sep. 12, 2023

(54) ELECTRIC CYLINDER SYSTEM AND METHOD OF DETECTING ABNORMALITY OF ELECTRIC CYLINDER

(71) Applicant: SINTOKOGIO, LTD., Nagoya (JP)

(72) Inventors: Yuu Ishida, Shinshiro (JP); Takuma Nakai, Shinshiro (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/639,853

(22) PCT Filed: Aug. 26, 2020

(86) PCT No.: PCT/JP2020/032220
§ 371 (c)(1),
(2) Date: Mar. 2, 2022

(87) PCT Pub. No.: WO2021/044926
PCT Pub. Date: Mar. 11, 2021

(65) Prior Publication Data
US 2022/0324190 A1    Oct. 13, 2022

(30) Foreign Application Priority Data
Sep. 6, 2019 (JP) .................. 2019-163015

(51) Int. Cl.
*B30B 1/18*    (2006.01)
*F16H 25/24*   (2006.01)
*B30B 15/00*   (2006.01)

(52) U.S. Cl.
CPC .......... *B30B 15/0094* (2013.01); *B30B 1/181* (2013.01); *B30B 1/186* (2013.01); *F16H 25/24* (2013.01)

(58) Field of Classification Search
CPC ........... B30B 1/18; B30B 1/181; B30B 1/186; B30B 15/26; B30B 15/28; B30B 15/288;
(Continued)

(56) References Cited

U.S. PATENT DOCUMENTS 7,552,676 B1 * 6/2009 Johnson .................. B30B 1/186
100/902
9,221,600 B2 * 12/2015 Iacobucci ............. B30B 9/3064
2013/0291609 A1   11/2013 Furukawa et al.

FOREIGN PATENT DOCUMENTS

CN    105531104 A  *  4/2016 ............. B30B 1/186
JP    H05-264375 A     10/1993
(Continued)

OTHER PUBLICATIONS

International Preliminary Report on Patentability dated Mar. 17, 2022 in International Patent Application No. PCT/JP2020/032220.

*Primary Examiner* — Jimmy T Nguyen
(74) *Attorney, Agent, or Firm* — Faegre Drinker Biddle & Reath LLP

(57) ABSTRACT

An electric cylinder system includes: a rod; a ball screw mechanism; a nut connected to the rod; a cylindrical body including a contact portion, the contact portion configured to be abutting the nut making the linear motion, the cylindrical body configured to support the ball screw mechanism in such a manner that the ball screw mechanism is displaceable in the axis direction of the ball screw; a strain detector fixed to the cylindrical body and configured to detect a value corresponding to a displacement of the ball screw mechanism; and a control section configured to make the ball screw mechanism be displaced by making the nut abut against the contact portion, and configured to detect an abnormality of the strain detector based on the value detected by the strain detector according to the displacement of the ball screw mechanism.

6 Claims, 9 Drawing Sheets

(58) Field of Classification Search
CPC ..... B30B 15/0094; F16H 25/22; F16H 25/24; F16H 2025/2081; F16H 2025/2096; F16H 25/2204

See application file for complete search history.

(56) References Cited

FOREIGN PATENT DOCUMENTS

| | | | | |
|---|---|---|---|---|
| JP | 06344187 A | * | 12/1994 | ............... B30B 1/18 |
| JP | 2004-148345 A | | 5/2004 | |
| JP | 2005-138110 A | | 6/2005 | |
| JP | 2012-147606 A | | 8/2012 | |
| WO | WO-2012096390 A1 | * | 7/2012 | ............. B30B 1/186 |

* cited by examiner

ELECTRIC CYLINDER SYSTEM AND METHOD OF DETECTING ABNORMALITY OF ELECTRIC CYLINDER

TECHNICAL FIELD

The present disclosure relates to an electric cylinder system and a method of detecting an abnormality of an electric cylinder.

BACKGROUND ART

Patent Document 1 discloses an electric press that presses a workpiece by moving a ram up and down. The electric press includes a load cell that detects a load applied on the ram. The electric press stores an output of the load cell when the load is zero, as a calibration quantity. Where the calibration quantity is equal to or exceeds a predetermined value, the electric press provides notification to urge replacement of the load cell. The predetermined value is a calibration quantity that may cause the load cell output to exceed an upper limit value or fall below a lower limit value during displacement of a position of pressing operation of the ram from a zero point at which there is no load to a maximum load position. The predetermined value is set on an assumption that the relationship between the load cell output and the position of the ram is linear.

CITATION LIST

Patent Document

Patent Document 1: Japanese Unexamined Patent Publication No. 2004-148345

SUMMARY OF INVENTION

Technical Problem

Since the electric press described in Patent Document 1 determines replacement of the load cell based only on the output of the load cell when there is no load, the electric press may fail to correctly make a determination on replacement of the load cell. For example, even though the output of the load cell when there is no load falls within an allowable range, the output of the load cell when there is a load may fail to fall within the allowable range.

The present disclosure provides an electric cylinder system that enables enhancing the accuracy of detection of an abnormality of a strain detector.

Solution to Problem

An electric cylinder system according to an aspect of the present disclosure includes: a rod; a ball screw mechanism including a ball screw making a rotary motion via a drive force of an electric motor; a nut connected to the rod, the nut making a linear motion in an axis direction of the ball screw together with the rod via the rotary motion of the ball screw; a cylindrical body including a contact portion, the nut making the linear motion abutting against the contact portion, the cylindrical body supporting the ball screw mechanism in such a manner that the ball screw mechanism is displaceable in the axis direction of the ball screw; a strain detector fixed to the cylindrical body and detecting a value corresponding to the displacement of the ball screw mechanism; and a control section making the ball screw mechanism be displaced by making the nut abut against the contact portion, and detecting an abnormality of the strain detector based on the value detected by the strain detector according to the displacement of the ball screw mechanism.

In this electric cylinder system, the nut makes a linear motion in the axis direction of the ball screw via a rotary motion of the ball screw. The nut making the linear motion abuts against the contact portion of the cylindrical body, causing a load to be generated on the ball screw mechanism with the contact portion of the cylindrical body as a fulcrum. The ball screw mechanism is displaced in the axis direction of the ball screw by the generated load. The strain detector detects a value corresponding to the displacement of the ball screw mechanism. In this way, this electric cylinder system can apply a load to the strain detector without using a workpiece. Therefore, the control section of this electric cylinder can detect an abnormality of the strain detector based on the value detected by the strain detector when there is a load. Therefore, this electric cylinder system enables enhancing the accuracy of detection of an abnormality of the strain detector in comparison with the case of detecting an abnormality of the strain detector based only on an output of the strain detector when there is no load.

In an embodiment, the strain detector may include an outer edge portion fixed to the cylindrical body and a movable portion being provided on an inner side of the outer edge portion and being displaceable in the axis direction of the ball screw, the ball screw mechanism may include a plurality of bearings rotatably supporting the ball screw, and the plurality of bearings may include a first bearing located between the contact portion of the cylindrical body and the strain detector and a second bearing holding the movable portion of the strain detector jointly with the first bearing. In this case, no matter which side in the axis direction of the ball screw the ball screw mechanism is displaced to, the strain detector can detect the displacement.

In an embodiment, the cylindrical body may include a first cylindrical body supporting the first bearing, the contact portion being provided in the first cylindrical body and a second cylindrical body supporting the second bearing. In this case, processing of the contact portion of the cylindrical body is easy, and thus, it is possible to reduce time necessary for manufacture of the cylindrical body in comparison with the case of manufacturing the cylindrical body from a single member.

In an embodiment, a gap may be provided between the contact portion of the cylindrical body and the first bearing, in an axis direction of the ball screw. Because of the gap being provided between the contact portion of the cylindrical body and the first bearing, the ball screw mechanism including the first bearing can move in the direction approaching the contact portion by the amount corresponding to the gap. Therefore, until the first bearing comes into contact with the contact portion, the strain detector can properly measure an amount of displacement of the ball screw mechanism for a load.

In an embodiment, the control section may detect the abnormality of the strain detector based on a comparison between the value corresponding to the displacement of the ball screw mechanism, the value being detected by the strain detector at a predetermined load value, and a reference value acquired in advance at the predetermined load value. In this case, this electric cylinder system can detect an abnormality of the strain detector based on a reference value acquired in advance.

A method of detecting an abnormality of an electric cylinder according to another aspect of the present disclosure includes: a step of making a ball screw of the electric cylinder make a rotary motion via a drive force of an electric motor, making a nut attached to the ball screw make a linear motion in an axis direction of the ball screw and making the nut making the linear motion abut against a contact portion provided in a cylindrical body of the electric cylinder; a step of making a ball screw mechanism including the ball screw be displaced in the axis direction of the ball screw with the contact portion provided in the cylindrical body as a fulcrum, by the abutted nut; a step of detecting a value corresponding to the displacement via a strain detector fixed to the cylindrical body; and a step of detecting an abnormality of the strain detector based on the value corresponding to the displacement, the value being detected in the step of detecting.

In the method of detecting an abnormality of an electric cylinder, the nut making a linear motion abuts against the contact portion provided in the cylindrical body of the electric cylinder. The abutted nut causes a load to be generated with the contact portion provided in the cylindrical body as a fulcrum, and the ball screw mechanism including the ball screw is displaced in the axis direction of the ball screw by the generated load. A value corresponding to the displacement of the ball screw is detected by the strain detector fixed to the cylindrical body. Then, an abnormality of the strain detector is detected based on the valve corresponding to the displacement of the ball screw. In this way, this method of detecting an abnormality of an electric cylinder enables applying a load to the strain detector without using a workpiece. Therefore, the control section of this electric cylinder can detect an abnormality of the strain detector based on the value detected by the strain detector when there is a load. Therefore, this method of detecting an abnormality of an electric cylinder enables enhancing the accuracy of detection of an abnormality of the strain detector in comparison with the case of detecting an abnormality of the strain detector based only on an output of the strain detector when there is no load.

Advantageous Effects of Invention

With an electric cylinder system according to the present disclosure, it is possible to enhance the accuracy of detection of an abnormality of a strain detector.

DESCRIPTION OF EMBODIMENTS

Figure 1:
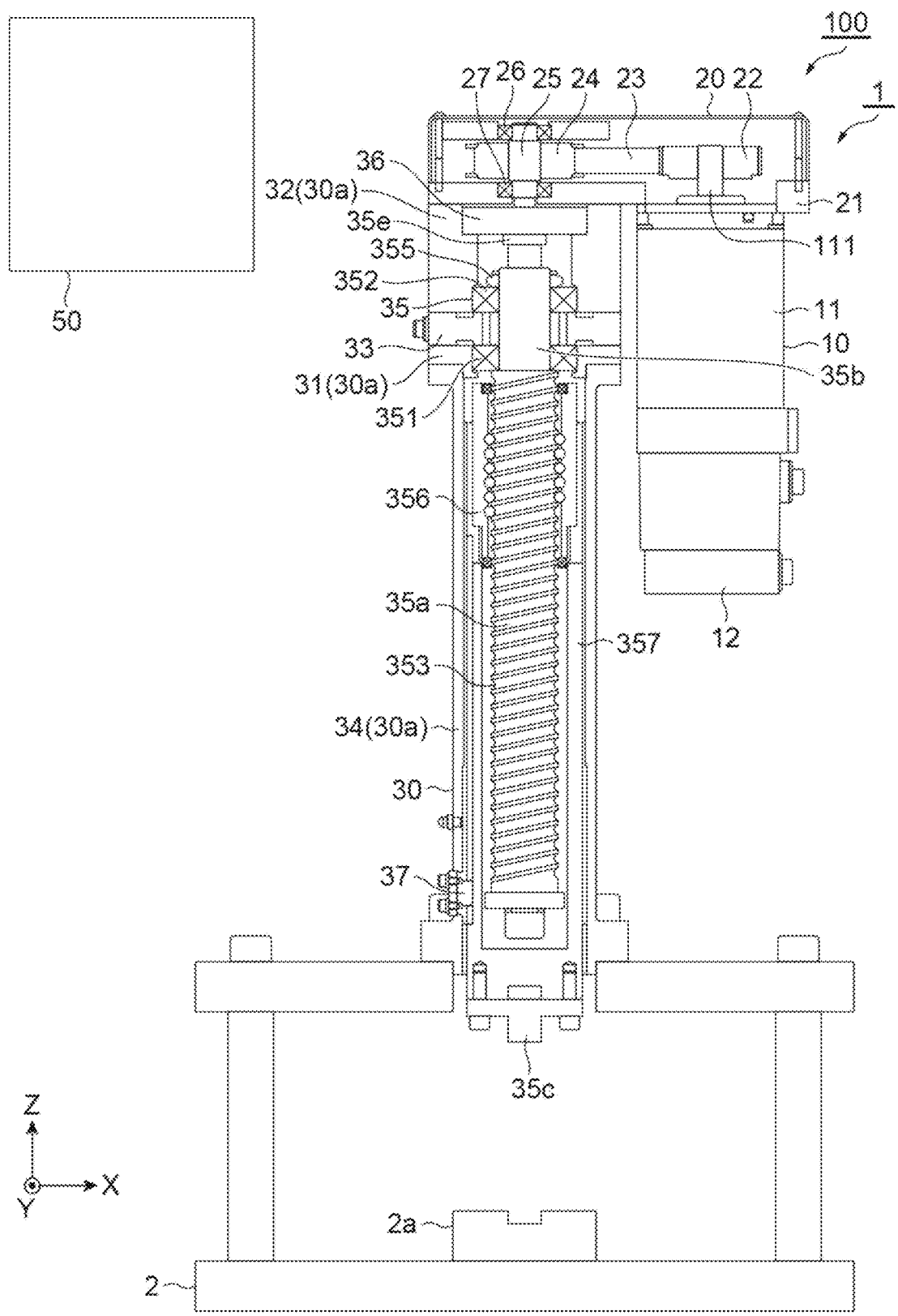
FIG. 1 is a schematic diagram illustrating an example of an electric cylinder system according to an embodiment.

An embodiment of the present disclosure will be described below with reference to the drawings. In the below description, elements that are identical or correspond to each other are provided with a same reference sign and overlapping description thereof is not repeated. Dimension ratios in the drawings do not necessarily agree with those in the description. The terms "upper (up)", "lower (down)", "left" and "right" are those based on the illustration and used for the sake of expediency.

[Configuration of Electric Cylinder System]

FIG. 1 is a schematic diagram illustrating an example of an electric cylinder system according to an embodiment. The X-direction and the Y-direction in the drawings are horizontal directions and the Z-direction in the drawings is a vertical direction. The X-direction, the Y-direction and the Z-direction are axis directions orthogonal to one another in a three-dimensional orthogonal coordinate system. The electric cylinder system 100 illustrated in FIG. 1 is a system that presses a workpiece (not illustrated) to perform, e.g., shaping or press-fitting. The electric cylinder system 100 includes an electric cylinder 1 and a control device 50. The electric cylinder 1 is fixed to a frame 2. The workpiece is placed on a workpiece table 2a of the frame 2 and is pressed between the workpiece table 2a and a distal end of a rod of the electric cylinder 1 by the rod being extended.

The electric cylinder 1 includes an electric motor 10, a rotation transmission mechanism 20 and a cylinder portion 30. In FIG. 1, the rotation transmission mechanism 20 and the cylinder portion 30 are each illustrated in section. The electric motor 10 is connected to the cylinder portion 30 via the rotation transmission mechanism 20. A drive force generated by the electric motor 10 is transmitted to the cylinder portion 30 via the rotation transmission mechanism 20. A control device 50 is connected to the electric cylinder 1 and controls operation of the electric cylinder 1. More specifically, the control device 50 are communicably connected to the electric motor 10 and the cylinder portion 30 and controls the electric motor 10.

The electric motor 10 generates a drive force via electric power supplied from the control device 50. The electric motor 10 is, for example, a servomotor. The electric motor 10 includes a motor body 11 and an encoder 12. The motor body 11 includes a motor shaft 111. The motor body 11 is supplied with electric power from the control device 50 and rotates the motor shaft 111 around an axis direction (here, the Z-direction) of the motor shaft 111. The encoder 12 detects a rotational angle of the motor shaft 111 and feeds the rotational angle back to the control device 50. The drive force generated by the electric motor 10 is transmitted to the rotation transmission mechanism 20 through the motor shaft 111.

The rotation transmission mechanism 20 transmits the drive force of the electric motor 10 to the cylinder portion 30. The rotation transmission mechanism 20 includes a casing 21, two timing pulleys 22, 24, a timing belt 23, a rotary shaft 25 and two bearings 26, 27. The casing 21 receives the two timing pulleys 22, 24, the timing belt 23, the rotary shaft 25 and the two bearings 26, 27 inside. The electric motor 10 is fixed to the outer side of the casing 21 and the motor shaft 111 of the electric motor 10 is connected to the timing pulley 22. The cylinder portion 30 is fixed to the outer side of the casing 21 in such a manner as to be provided side by side with the electric motor 10. The rotary shaft 25 rotatably supported by the two bearings 26, 27 is connected to the timing pulley 24. The two timing pulleys 22, 24 are linked by the timing belt 23. The drive force generated by the electric motor 10 is transmitted from the timing pulley 22 to the timing pulley 24 via the timing belt 23 and rotates the rotary shaft 25 around an axis direction (here, the Z-direction) of the rotary shaft 25.

The cylinder portion 30 operates based on the drive force transmitted from the rotation transmission mechanism 20. The cylinder portion 30 includes a cylindrical body 30a, a strain detector 33, a ball screw mechanism 35, a nut 356, a rod 357, a reducer 36 and a sliding key 37. The cylindrical body 30a receives or holds the strain detector 33, the ball screw mechanism 35, the nut 356, the rod 357 and the reducer 36. An opening that enables access of the sliding key 37 to a groove of the rod, which will be described later, is provided in an outer circumferential surface of the cylindrical body 30a. The reducer 36 is connected to the ball screw mechanism 35 via a spline portion 35e of a ball screw 353. The rotary shaft 25 is connected to the reducer 36. The drive force of the rotary shaft 25 is transmitted to the ball screw mechanism 35 via the reducer 36 and the spline portion 35e of the ball screw 353 and then transformed to a drive force for linear motion of the rod by the ball screw mechanism 35 and the sliding key 37.

Figure 2:
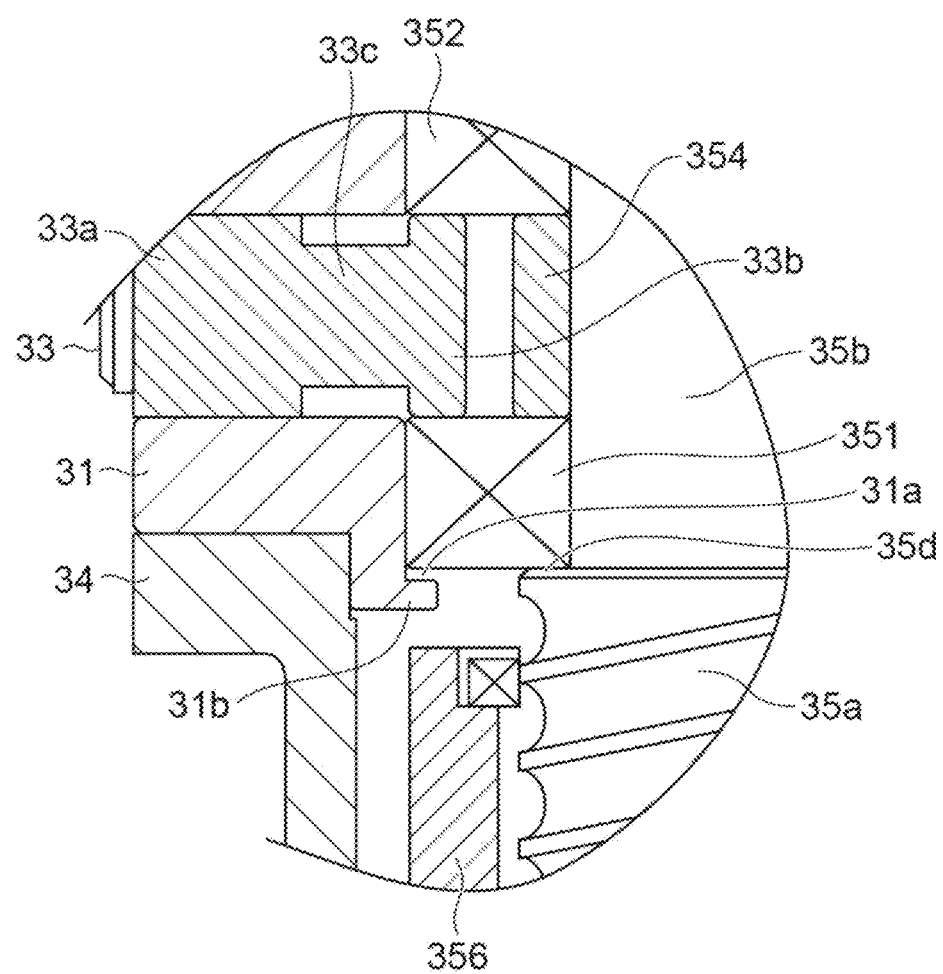
FIG. 2 is a partial enlargement of a section of the ball screw mechanism in FIG. 1.

FIG. 2 is a partial enlargement of the section of the ball screw mechanism in FIG. 1. As illustrated in FIGS. 1 and 2, the ball screw mechanism 35 includes two bearings 351, 352 (an example of a plurality of bearings), the ball screw 353, a collar 354 and a bearing nut 355. The ball screw 353 extends in the axis direction of the rotary shaft 25 and includes a thread portion 35a, a columnar portion 35b and a spline portion 35e. The thread portion 35a is a rod-like member including a thread at an outer circumferential surface, the nut 356 being threadably engaged with the rod-like member. The columnar portion 35b is connected to an end of the thread portion 35a and has a shape with a diameter reduced relative to the thread portion 35a. At the end of the thread portion 35a, a step surface 35d is formed because of a difference in diameter from the columnar portion 35b. The spline portion 35e is formed at an end of the columnar portion 35b, has, for example, a spline shape that is based on an involute curve at an outer circumferential surface, and is fitted in a spline shape provided at an inner circumferential surface of the reducer 36. The columnar portion 35b is rotatably supported by the two bearings 351, 352. The bearing 351 (an example of a first bearing) is provided in such a manner as to be in contact with the step surface 35d of the thread portion 35a. The bearing 352 (an example of a second bearing) is located on the end of the columnar portion 35b. The two bearings 351, 352 jointly hold the collar 354. The collar 354 is held between the two bearings 351, 352. Furthermore, the bearing nut 355 is provided on the end of the columnar portion 35b. The bearing nut 355 holds the bearings 351, 352 holding the collar 354, jointly with the step surface 35d of the thread portion 35a.

The nut 356 is threadably connected to the ball screw 353. A rotative force of the ball screw 353 is transmitted to the nut 356. The nut 356 is connected to the rod 357. A keyway provided in the rod 357 fits in the sliding key 37 provided at the cylindrical body 30a. The rotative force transmitted to the nut 356 is restricted from rotary motion, by the keyway of the rod 357 and the sliding key 37 and becomes a drive force in an axis direction (here, the Z-direction) of the ball screw 353. In this way, the nut 356 makes a linear motion together with the rod 357 in the axis direction of the ball screw 353 via a rotary motion of the ball screw 353.

The cylindrical body 30a supports the ball screw mechanism 35 in such a manner that the ball screw mechanism 35 is displaceable in the axis direction of the ball screw 353. The cylindrical body 30a includes a cylindrical body 31 (an example of a first cylindrical body), a cylindrical body 32 (an example of a second cylindrical body) and a cylindrical body 34 and is configured by the cylindrical body 31, the cylindrical body 32 and the cylindrical body 34 being joined. The cylindrical body 31 receives the bearing 351 and supports the bearing 351 in such a manner that the bearing 351 is displaceable in the axis direction of the ball screw 353. The inner diameter of the cylindrical body 31 is substantially equal to the outer diameter of the bearing 351. The cylindrical body 31 includes a contact portion 31b that the nut 356 in a linear motion abuts against. The contact portion 31b is a part (flange) that projects to the inner side of the cylindrical body 31 at a distal end of the cylindrical body 31. The inner diameter of the contact portion 31b is smaller than the outer diameter of the nut 356. Therefore, the nut 356 abuts against the contact portion 31b when moving to an end of the ball screw mechanism 35.

A gap 31a is provided between the contact portion 31b and the bearing 351. In other words, the contact portion 31b and the bearing 351 are not in contact with each other, allowing displacement, in the axis direction of the ball screw 353, of the ball screw mechanism 35 by the amount corresponding to the gap 31a. The gap 31a is, as an example, 0.5 to 2.0 mm, but is not limited to such size range, in other words, may be a gap of any size as long as such gap enables the later-described strain detector 33 to detect displacement of the ball screw mechanism 35.

The cylindrical body 32 receives the bearing 352 and supports the bearing 352 in such a manner that the bearing 352 is displaceable in the axis direction of the ball screw 353. In other words, the bearing 351 and the bearing 352 are displaceably supported by the cylindrical body 31 and the cylindrical body 32, respectively. The ball screw mechanism 35 is supported by the cylindrical body 31 and the cylindrical body 32 in such a manner as to be displaceable in the axis direction of the ball screw 353.

The strain detector 33 detects a value corresponding to a displacement of the ball screw mechanism 35. The strain detector 33 is, as an example, a load cell. The strain detector 33 includes an outer edge portion 33a and a movable portion 33b. The strain detector 33 is, as an example, a plate-like member. The outer edge portion 33a forms an edge of the plate-like member and is fixed to the cylindrical body 30a. As an example, the outer edge portion 33a is held between the cylindrical body 31 and the cylindrical body 32. The movable portion 33b is provided on the inner side of the outer edge portion 33a and is displaceable in the axis direction of the ball screw 353. For example, the movable portion 33b is connected to the outer edge portion 33a via an elastic portion 33c on the inner side of the outer edge portion 33a of the plate-like member. A strain gauge is provided in the elastic portion 33c. The strain gauge outputs a value corresponding to a displacement of the movable portion 33b based on strain of the elastic portion 33c according to the displacement of the movable portion 33b.

The bearing 351 is located between the contact portion 31b of the cylindrical body 30a and the movable portion 33b of the strain detector 33. The bearing 352 holds the movable portion 33b of the strain detector 33 jointly with the bearing 351. Consequently, the movable portion 33b is held between the bearing 351 and the bearing 352 and is displaced together with the bearing 351 and the bearing 352. A displacement of the ball screw mechanism 35 is transmitted to the movable portion 33b via the bearing 351 and the bearing 352.

Figure 3A:
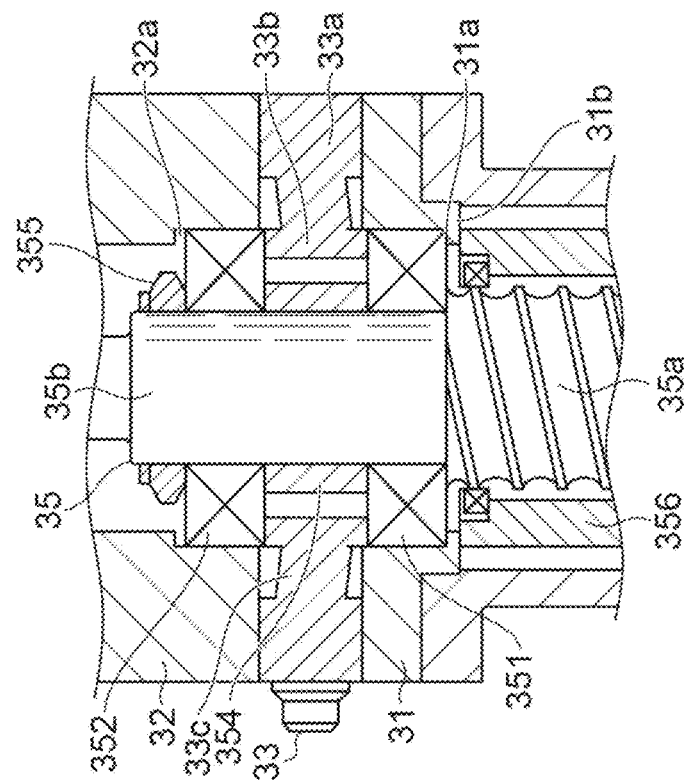
FIG. 3A is a partial enlargement of a section before displacement of a ball screw mechanism.
Figure 3B:
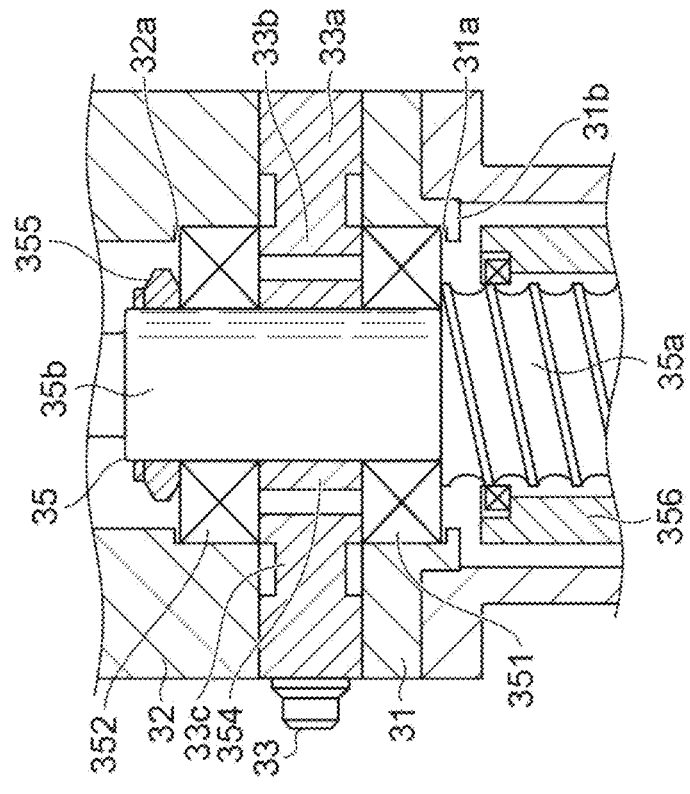
FIG. 3B is a partial enlargement of the section after displacement of the ball screw mechanism.

Figure FIGS. 3A and 3B include conceptual diagrams of a case where the ball screw mechanism 35 is displaced by the nut 356 abutting against the contact portion 31b. FIG. 3A indicates a position of the ball screw mechanism 35 before the nut 356 abuts against the contact portion 31b. There is a space between the nut 356 and the contact portion 31b and the nut 356 and the contact portion 31b are not in contact with each other. The gap 31a is provided between the bearing 351 and the contact portion 31b. A gap 32a that is substantially equal in width to the gap 31a is also provided between the bearing 352 and the cylindrical body 32. The movable portion 33b is not displaced and positioned in plane with the outer edge portion 33a.

FIG. 3B illustrates the position after the ball screw mechanism 35 is displaced. Upon the nut 356 being brought into a linear motion in a contraction direction of the rod 357, the nut 356 abuts against the contact portion 31b. The nut 356 displaces the ball screw mechanism 35 in an extension direction of the rod 357 with the contact portion 31b as a fulcrum. As a result of the displacement of the ball screw mechanism 35 in the extension direction of the rod 357, the gap 31a becomes smaller and the gap 32a becomes wider. The movable portion 33b is displaced together with the ball screw mechanism 35 and becomes closer to the nut 356 than the outer edge portion 33a is. In this way, the electric cylinder 1 can provide a load to the strain detector 33 without using a workpiece. Note that since the ball screw 353 and the reducer 36 are connected via the spline portion 35e of the ball screw 353, transmission of a rotative force is not affected even if the ball screw mechanism 35 is displaced in the axis direction of the ball screw 353.

[Configuration of Control Device]

Figure 4:
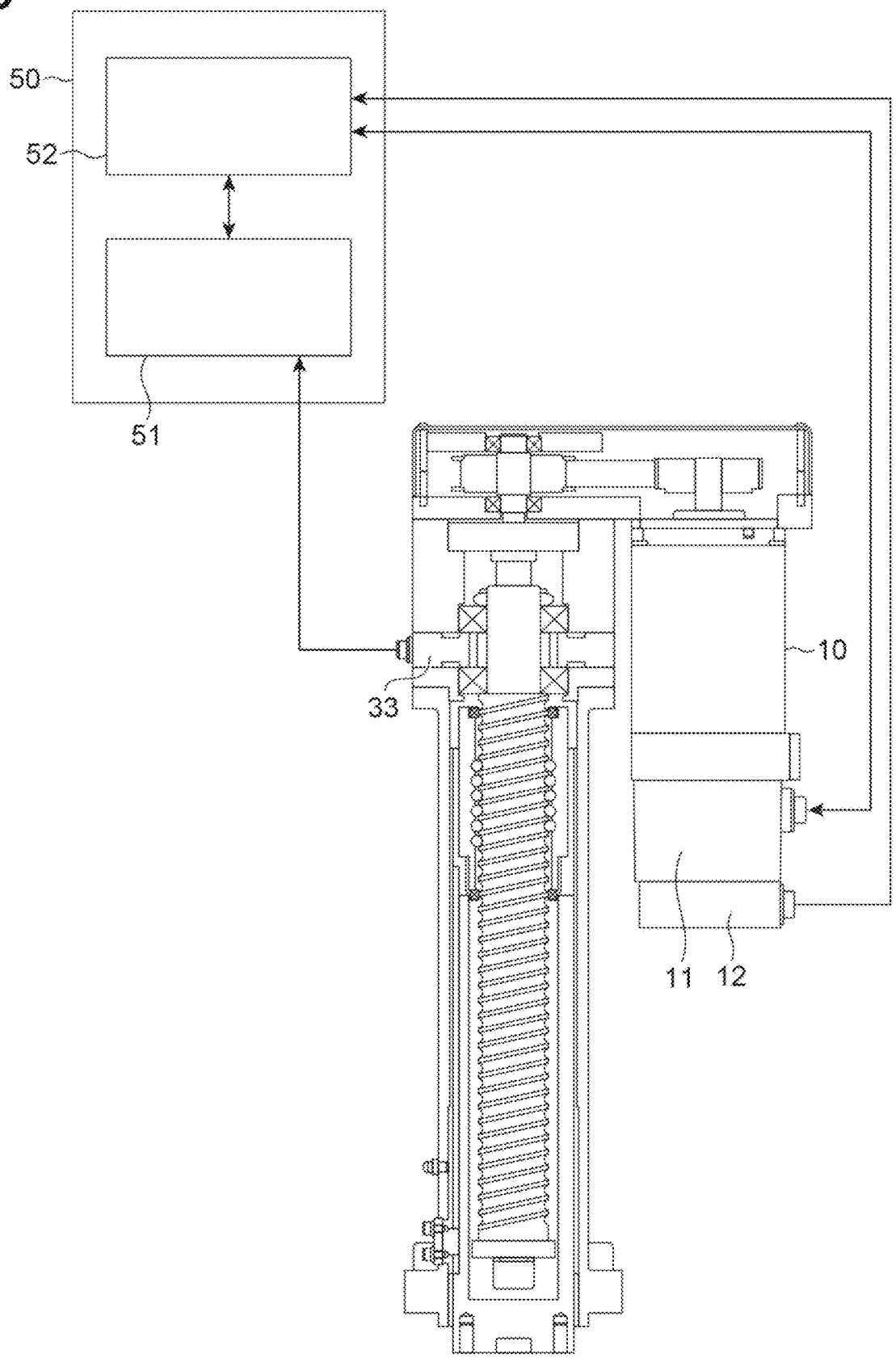
FIG. 4 is a schematic diagram illustrating the relationship among a control device, a cylinder portion and an electric motor.

FIG. 4 is a schematic diagram illustrating the relationship among the control device 50, the cylinder portion 30 and the electric motor 10. The control device 50 includes a control section 51 and a motor driver 52. The control section 51 bidirectionally communicably connected to the motor driver 52. The control section 51 is, for example, a servo controller or a programmable logic controller. The control section 51 may be configured by, for example, a general-purpose computer including, e.g., an arithmetic device such as a CPU (central processing unit), storage devices such a ROM (read-only memory), a RAM (random access memory) and an HDD (hard disk drive) and a communication device.

A signal corresponding to a displacement of the movable portion 33b of the strain detector 33 is input to the control section 51. The motor driver 52 is, for example, a servo amplifier. A signal corresponding to a rotational angle of the motor shaft 111 is input from the encoder 12 to the motor driver 52. The motor driver 52 controls the electric motor 10 by making an electric current flow in the motor body 11 based on the signal input from the encoder 12. A torque load factor of the electric motor 10 is calculated based on a value of the current flowing at this time and a rated current value of the electric motor 10.

Figure 5:
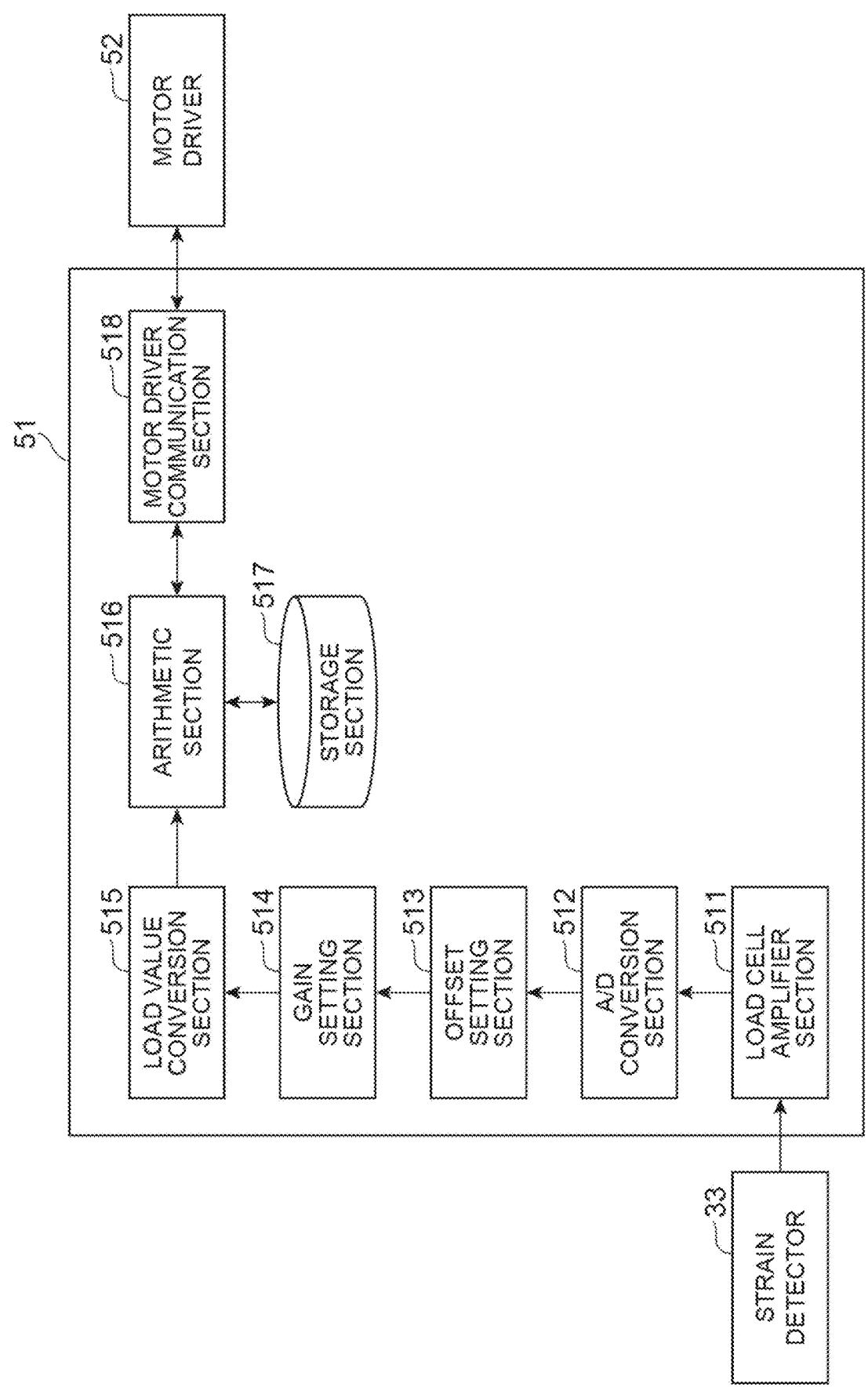
FIG. 5 is a block diagram illustrating an example of functions of the control device.

FIG. 5 is a block diagram illustrating the control section 51 of the control device 50. The control section 51 includes a load cell amplifier section 511, an A/D conversion section 512, a gain setting section 514, an offset setting section 513, a load value conversion section 515, an arithmetic section 516, a storage section 517 and a motor driver communication section 518.

The load cell amplifier section 511 converts a displacement of the movable portion 33b into a voltage value signal. The A/D conversion section 512 converts the voltage value signal input from the load cell amplifier section 511 into a digital electric signal. The gain setting section 514 adjusts a gain by multiplying the digital electric signal input from the A/D conversion section 512 by a multiplier. The offset setting section 513 adjusts an output of the strain detector 33 when there is no load, by adding a correction value to the digital electric signal input from the gain setting section 514. The load value conversion section 515 converts the digital electric signal input from the offset setting section 513 from the digital electric signal corresponding to the displacement of the movable portion 33b to a digital electric signal corresponding to a load applied to the movable portion 33b.

The motor driver communication section 518 bidirectionally communicates with the motor driver 52 and the arithmetic section 516. For example, the value of the current flowing in the motor body 11, the torque load factor based on the current value or the rotational angle of the motor shaft 111 is input from the motor driver 52 to the motor driver communication section 518. The motor driver communication section 518 outputs a signal for controlling the electric motor 10 to the motor driver 52 based on an instruction input from the arithmetic section 516.

The arithmetic section 516 outputs the load received by the movable portion 33b to the storage section 517 based on the digital electric signal input from the load value conversion section 515. The arithmetic section 516 outputs, e.g., the value of the current applied to the motor body 11, the torque load factor based on the current value or the rotational angle of the motor shaft 111 (an example of a value corresponding to the displacement of the ball screw mechanism), which has been input from the motor driver communication section 518, to the storage section 517. Also, the arithmetic section 516 outputs an instruction for controlling the electric motor 10 to the motor driver 52 by referring to the storage section 517.

The arithmetic section 516 performs control of the electric motor 10 based on the load on the strain detector 33, the load being stored in the storage section 517, and detects an abnormality of the strain detector 33 based on the torque load factor of the electric motor 10 at this time. For example, the arithmetic section 516 stores a torque load factor of the electric motor 10 and a load on the movable portion 33b in the storage section 517 as reference values. The reference value is a torque load factor when a load is actually imposed. Next, the arithmetic section 516 outputs an instruction for pushing the nut 356 against the contact portion 31b to the motor driver 52, until the resulting load becomes equal to the load stored in the storage section 517. The arithmetic section 516 compares the torque load factor of the electric motor 10 obtained as a result of the nut 356 being pushed against the contact portion 31b and the torque load factor (an example of a reference value) stored in the storage section 517 with each other and the arithmetic section 516 detects an abnormality of the strain detector 33.

[Operation of Electric Cylinder System]

Figure 6:
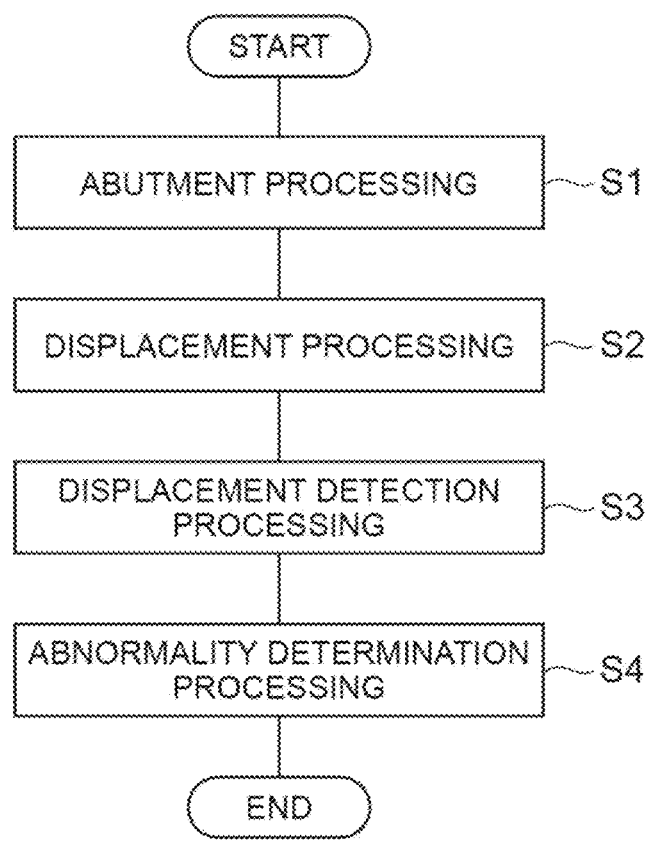
FIG. 6 is a flowchart illustrating an example of the process of detecting an abnormality of a strain detector.

Next, an example of the process of the electric cylinder 1 detecting an abnormality of the strain detector 33 will be described. FIG. 6 is a flowchart illustrating an example of the process of detecting an abnormality of a strain detector. The flowchart illustrated in FIG. 6 is executed by the control device 50.

As illustrated in FIG. 6, first, as abutment processing (step S1), the control device 50 makes the ball screw 353 of the electric cylinder 1 make a rotary motion via a drive force of the electric motor 10 and makes the nut 356 attached to the ball screw 353 make a linear motion in the axis direction (contraction direction) of the ball screw 353 to bring the nut 356 in a linear motion into abutment with the contact portion 31b provided in the cylindrical body 30a of the electric cylinder 1.

Subsequently, as displacement processing (step S2), the control device 50 makes the ball screw mechanism 35 including the ball screw 353 be displaced in the axis direction of the ball screw 353 with the contact portion 31b of the cylindrical body 30a as a fulcrum, by the abutted nut 356 (FIG. 3B).

Subsequently, as displacement detection processing (step S3), the control device 50 detects a value corresponding to the displacement, via the strain detector 33 fixed to the cylindrical body 30a.

Subsequently, as abnormality determination processing (step S4), the control device 50 detects an abnormality of the strain detector 33 based on the value corresponding to the displacement, which has been detected in the displacement detection processing (step S3). The control device 50 calculates the torque load factor of the electric motor 10 based on, for example, a displacement of the ball screw mechanism 35, the displacement being detected by the strain detector 33 at a predetermined load value. Then, the control device 50 detects an abnormality of the strain detector 33 based on a comparison between the torque load factor of the electric motor 10 and the reference value (torque load factor when a load is actually imposed) stored in the storage section 517. For example, if the absolute value of the difference between the torque load factor of the electric motor 10 and the reference value is equal to or below a threshold value set in advance, the control device 50 determines that the strain detector 33 is normal. For example, if the absolute value of the difference between the torque load factor and the reference value of the electric motor 10 exceeds the threshold value set in advance, the control device 50 determines that the strain detector 33 is abnormal. Upon an end of the abnormality determination processing (step S4), the flowchart illustrated in FIG. 6 ends.

By the flowchart illustrated in FIG. 6 being executed, it is possible to compare a past torque load factor actually measured at a predetermined load value and a current torque load factor actually measured for the predetermined load value with each other and detect an abnormality of the strain detector 33.

Figure 7:
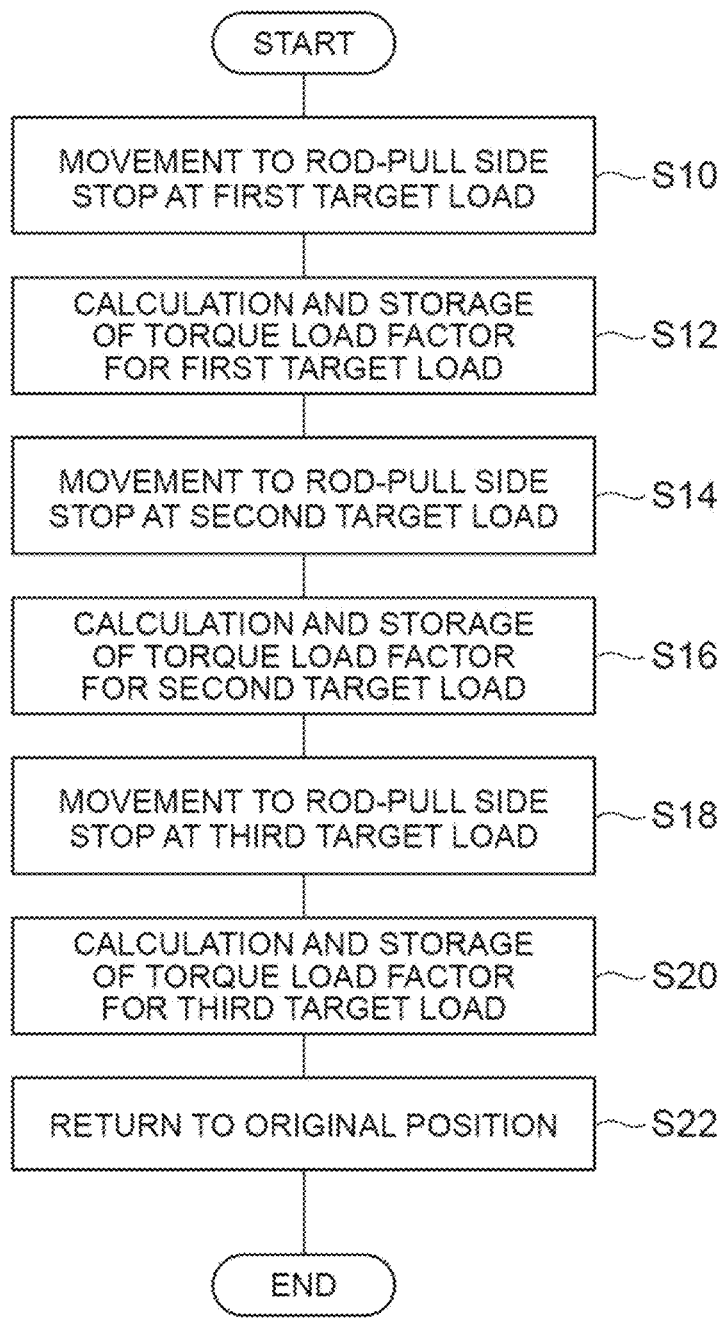
FIG. 7 is a flowchart for storing torque load factors that are reference values.
Figure 8:
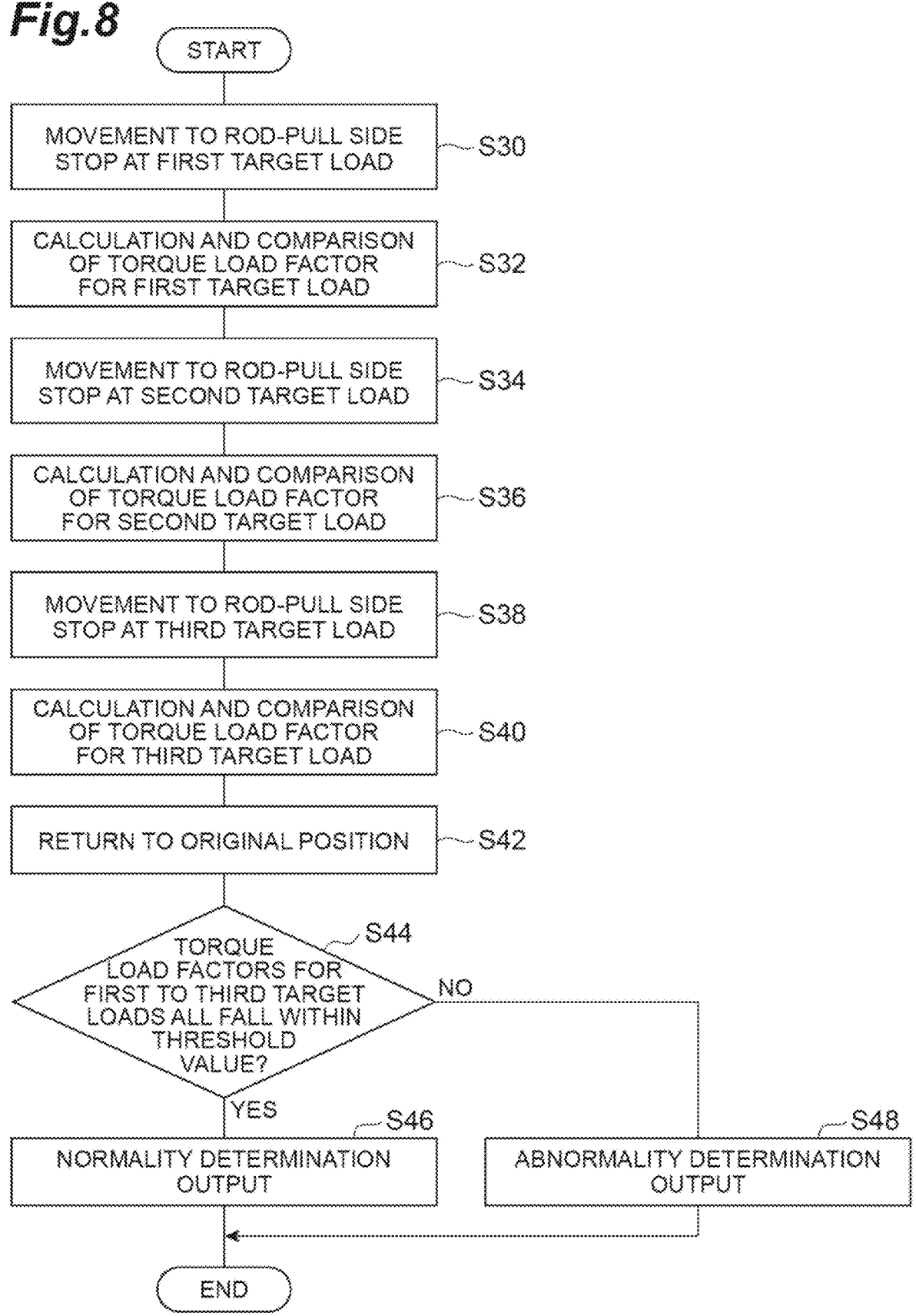
FIG. 8 is a flowchart illustrating another example of the process of detecting an abnormality of a strain detector.
Figure 9:
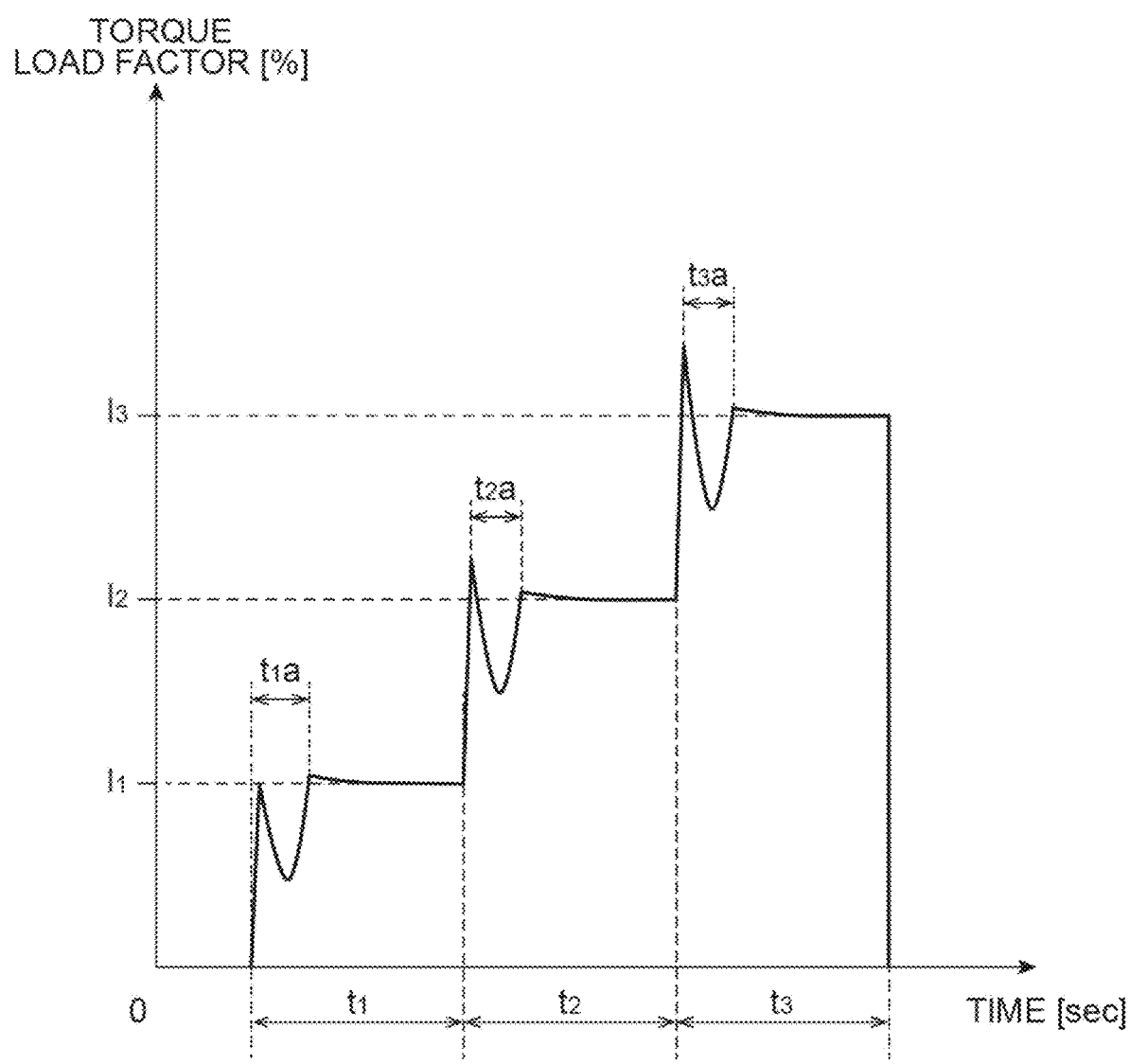
FIG. 9 is a graph illustrating the relationship between time and the load factor of the electric motor.

The control device 50 can also detect an abnormality of the strain detector 33 by varying the predetermined load value described with reference to FIG. 6 and performing comparison for a plurality of load values. FIG. 7 is a flowchart illustrating the process of torque load factors being stored as a reference value. FIG. 8 is a flowchart illustrating the process of detecting an abnormality of the strain detector 33 by comparing a torque load factor with a reference value, for each target load. FIG. 9 is a graph illustrating the relationship between time and the torque load factor for each target load. The processes illustrated in FIGS. 7 and 8 are executed by the control device 50.

In the process in FIG. 7, as an example, three target loads are set. This process is performed using the electric cylinder system 100 calibrated. A target load is a value of a load applied to the strain detector 33 by the control device 50 when detecting an abnormality of the strain detector 33. In the process in FIG. 7, with a rated thrust force of the electric cylinder 1 as a maximum load value, values obtained by dividing the maximum load value into three are set as a first target load, a second target load and a third target load, respectively. These target loads are equal to the target loads in FIG. 8. Also, torque load factors for these target loads are indicated in FIG. 9.

As illustrated in FIG. 7, in step S10, the control device 50 makes the rod 357 and the nut 356 make a linear motion in the contraction direction of the rod 357 in the axis direction of the ball screw 353 and abut against the contact portion 31b. The abutted nut 356 displaces the ball screw mechanism 35 in the extension direction of the rod 357 with the contact portion 31b as a fulcrum. The movable portion 33b is displaced together with the ball screw mechanism 35 and becomes closer to the nut 356 than the outer edge portion 33a is. The control device 50 measures a load on the strain detector 33 based on a signal corresponding to the displacement of the movable portion 33b. When the load reaches the first target load, the control device 50 stops the rod 357 and the nut 356 with the rod 357 and the nut 356 maintained in abutment with the contact portion 31b. In other words, the control device 50 controls the electric motor 10 in such a manner that the load applied to the strain detector 33 from the ball screw mechanism 35 reaches the first target load.

In step S12, the control device 50 calculates a torque load factor of the electric motor 10 when the first target load is applied to the strain detector 33 and stores the torque load factor in the storage section 517 as a reference value. As illustrated in FIG. 9, a torque load factor largely varies immediately after reaching a target load and then stabilizes. If a largely varying torque load factor is stored as a reference value, detection of an abnormality of the strain detector 33 is not correctly performed, and thus, a stabilized torque load factor is stored as a reference value. As an example, the control device 50 can calculate a stable torque load factor by a torque load factor stable range being set.

The procedure of the control device 50 with a torque load factor stable range set calculating a torque load factor will be described with reference to FIG. 9. Even if a load value of the strain detector 33 reaches the first target load ($l_1$), the control device 50 with a torque load factor stable range set maintains such state for a certain period ($t_1$). After a lapse of the certain period ($t_1$), the control device 50 goes back in time and calculates an average value of the torque load factor and excludes a time ($t_{1a}$) during which the torque load factor falls out of the torque load factor stable range from the calculation of the average value. The control device 50 stores the average value of the torque load factor that have been calculated through the above process in the storage section 517 as a reference value of the torque load factor. In the below, likewise, for the second target load ($l_2$), the control device 50 performs processing for excluding a time ($t_{2a}$) during which the torque load factor falls out from the torque load factor stable range from calculation of an average value and performs processing similar to the above also for the third target load ($l_3$).

In steps S14 to S16, operations that are the same as those in steps S10 to S12 above are performed with the target load changed to the second target load. Also, in steps S18 to S20, operations that are the same as those in steps S10 to S12 above are performed with the target load changed to the third target load. In steps S10 to S20, the torque load factors of the electric motor 10 for the three target loads are stored in the storage section 517 as reference values. In step S22, the control device 50 makes the rod 357 and the nut 356 abutting against the contact portion 31b move to a predetermined original position at which no load is applied to the strain detector 33 in the axis direction of the ball screw 353. Upon an end of step S22, the flowchart illustrated in FIG. 7 ends.

Next, the process of detecting an abnormality of the strain detector 33 will be described. Detection of an abnormality of the strain detector 33 is performed during regular work, and for example, is performed during an inspection before a start of work. As illustrated in FIG. 8, in step S30, the control device 50 performs an operation that is the same as that in step S10 and controls the electric motor 10 in such a manner that a load applied from the ball screw mechanism 35 to the strain detector 33 reaches the first target load.

In step S32, the control device 50 calculates a torque load factor of the electric motor 10 when the first target load is applied to the strain detector 33 and performs a comparison with the torque load factor in step S12. More specifically, the arithmetic section 516 compares the torque load factor in step S12 stored in the storage section 517 as a reference value and the actual torque load factor in step S32 with each other. The comparison refers to the work of setting a threshold value for the torque load factor in step S12 stored in the storage section 517 as a reference value and determining whether or not an actual torque load factor falls within the threshold value.

In steps S34 to S36, operations that are the same as those in steps S30 to S32 above are performed with the target load changed to the second target load. Also, in steps S38 to S40, operations that are the same as those in steps S30 to S32 above are performed with the target load changed to the third target load. In step S42, as in step S22, the control device 50 makes the rod 357 and the nut 356 move to the predetermined original position.

In step S44, an abnormality of the strain detector 33 is detected based on respective results of the comparisons in steps S32, S36 and S40. As an example, if the results of the torque load factor comparisons for the respective target loads all fall within the threshold value, the arithmetic section 516 determines that the strain detector 33 is normal and outputs a normality determination in step S46. In a case not falling under the above, the arithmetic section 516 determines that there is an abnormality in the strain detector 33 and outputs the abnormality determination in step S48.

The process in steps S10 to S22 is stored in the storage section 517 as an operation program for master data acquisition. Also, the process in steps S30 to S42 is stored in the storage section 517 as an operation program for detection of an abnormality of the strain detector 33. The control device 50 executes the above programs via an operator's operation.

Conclusion of Embodiment

According to the electric cylinder system 100 and the method of detecting an abnormality of the electric cylinder 1, the nut 356 makes a linear motion in the axis direction of the ball screw 353 via a rotary motion of the ball screw 353. The nut 356 in the linear motion abuts against the contact portion 31b of the cylindrical body 30a, causing a load to be generated on the ball screw mechanism 35 with the contact portion 31b of the cylindrical body 30a as a fulcrum. The ball screw mechanism 35 is displaced in the axis direction of the ball screw 353 by the generated load. The strain detector 33 detects a value corresponding to the displacement of the ball screw mechanism 35. In this way, this electric cylinder system 100 can apply a load to the strain detector 33 without using a workpiece. Therefore, the control section 51 of this electric cylinder 1 can detect an abnormality of the strain detector 33 based on the value detected by the strain detector 33 when there is a load. In other words, the control section 51 can detect an abnormality of the strain detector 33 in consideration of variation in relationship between the output value of the strain detector 33 and the load due to age-related deterioration (variation due to curing and deterioration of an adhesive material for the strain gauge). Therefore, this electric cylinder system 100 enables enhancing the accuracy of detection of an abnormality of the strain detector 33 in comparison with the case of detecting an abnormality of the strain detector 33 based only on an output of the strain detector 33 when there is no load.

Because of the cylindrical body 30a including the cylindrical body 31 supporting the bearing 351, the contact portion 31b being provided in the cylindrical body 31, and the cylindrical body 32 supporting the bearing 352, processing of the contact portion 31b is easy, and thus, it is possible to reduce time necessary for manufacture of the cylindrical body 30a in comparison with the case of manufacturing the cylindrical body 30a from a single member.

Because of the gap 31a being provided between the contact portion 31b of the cylindrical body 30a and the bearing 351 in the axis direction of the ball screw 353, the ball screw mechanism 35 can move in the direction approaching the contact portion 31b by the amount corresponding to the gap 31a. Therefore, until the bearing 351 comes into contact with the contact portion 31b, the strain detector 33 can properly measure an amount of displacement of the ball screw mechanism 35 for a load.

[Alterations]

Although various exemplary embodiments have been described above, the present disclosure is not limited to the above exemplary embodiments, but various omissions, replacements and changes may be made. For example, detection of an abnormality of the strain detector 33 may be performed with the torque load factor replaced with the current value. Also, with target torque load factors set instead of the target loads, the process of detecting an abnormality of the strain detector 33 by performing comparison of a load at each target torque load factor may be provided. An abnormality of the strain detector 33 may be detected by calculating torque load factors for a plurality of target loads and evaluating the linearity of the output of the strain detector 33.

The electric cylinder system 100 may detect an abnormality of the strain detector 33 when pressing a workpiece. In this case, a workpiece pressing portion 35c of the rod 357 in a linear motion in the extension direction abuts against a workpiece (not illustrated). The rod 357 displaces the ball screw mechanism 35 in the contraction direction of the rod 357 with the workpiece as a fulcrum. As a result of the displacement in the contraction direction of the ball screw mechanism 35, the gap 32a becomes smaller and the gap 31a becomes wider. The movable portion 33b is displaced together with the ball screw mechanism 35 and becomes more away from the nut 356 than the outer edge portion 33a is. The control device 50 measures a load on the strain detector 33 based on a signal corresponding to the displacement of the movable portion 33b. When the load reaches the first target load, the control device 50 makes the rod 357 stop with the rod 357 maintained in abutment with the workpiece. By operating in this way, the electric cylinder system 100 can detect an abnormality of the strain detector 33 when pressing a workpiece. Such operation is implemented by holding the movable portion 33b of the strain detector 33 via the two bearings 351, 352. With such configuration, no matter which side in the axis direction of the ball screw 353 the ball screw mechanism 35 is displaced to, the strain detector 33 can detect the displacement.

In the electric cylinder system 100, a contact portion that a distal end of the nut 356 abuts against may be provided at an inner portion of the cylindrical body 34. In this case, the electric cylinder system 100 can detect an abnormality of the strain detector 33 through a procedure that is the same as that of the above-described case of pressing a workpiece.

The electric cylinder 1 may include no bearings 351, 352. The cylindrical body 30a may be configured by a single member. The cylindrical body 31 and the cylindrical body 34 may be formed integrally. The strain detector 33 only needs to be fixed to the cylindrical body 30a and is not limited to being held between separated cylindrical bodies.

REFERENCE SIGNS LIST

100 . . . electric cylinder system, 1 . . . electric cylinder, 10 . . . electric motor, 20 . . . rotation transmission mechanism, 30 . . . cylinder portion, 31 . . . cylindrical body, 31a . . . gap, 31b . . . contact portion, 33 . . . strain detector, 33a . . . outer edge portion, 33b . . . movable portion, 35 . . . ball screw mechanism, 351 . . . bearing, 352 . . . bearing, 353 . . . ball screw, 356 . . . nut, 357 . . . rod, 50 . . . control device, 51 . . . control section, 516 . . . arithmetic section, 517 . . . storage section, 52 . . . motor driver

The invention claimed is:

1. An electric cylinder system comprising:
a rod;
a ball screw mechanism including a ball screw configured to make a rotary motion via a drive force of an electric motor;
a nut connected to the rod and configured to make a linear motion in an axis direction of the ball screw together with the rod via the rotary motion of the ball screw;
a cylindrical body including a contact portion, the contact portion configured to be abutting the nut making the linear motion, the cylindrical body configured to support the ball screw mechanism in such a manner that the ball screw mechanism is displaceable in the axis direction of the ball screw;
a strain detector fixed to the cylindrical body and configured to detect a value corresponding to a displacement of the ball screw mechanism; and
a control section configured to make the ball screw mechanism be displaced by making the nut abut against the contact portion, and configured to detect an abnormality of the strain detector based on the value detected by the strain detector according to the displacement of the ball screw mechanism.

2. The electric cylinder system according to claim 1, wherein:
the strain detector includes
an outer edge portion fixed to the cylindrical body and
a movable portion being provided on an inner side of the outer edge portion and configured to be displaceable in the axis direction of the ball screw;
the ball screw mechanism includes a plurality of bearings rotatably supporting the ball screw; and
the plurality of bearings include
a first bearing located between the contact portion of the cylindrical body and the movable portion of the strain detector and
a second bearing holding the movable portion of the strain detector jointly with the first bearing.

3. The electric cylinder system according to claim 2, wherein the cylindrical body includes
a first cylindrical body supporting the first bearing, the contact portion being provided in the first cylindrical body, and
a second cylindrical body supporting the second bearing.

4. The electric cylinder system according to claim 2, wherein a gap is provided between the contact portion of the cylindrical body and the first bearing.

5. The electric cylinder system according to claim 1, wherein the control section configured to detect the abnormality of the strain detector based on a comparison between the value corresponding to the displacement of the ball screw mechanism, the value being detected by the strain detector at a predetermined load value, and a reference value acquired in advance at the predetermined load value.

6. A method of detecting an abnormality of an electric cylinder, comprising:
making a ball screw of the electric cylinder make a rotary motion via a drive force of an electric motor, making a nut attached to the ball screw make a linear motion in an axis direction of the ball screw and making the nut making the linear motion abut against a contact portion provided in a cylindrical body of the electric cylinder;
making a ball screw mechanism including the ball screw be displaced in the axis direction of the ball screw with the contact portion provided in the cylindrical body as a fulcrum, by abutting the nut against the contact portion;
detecting a value corresponding to a of the ball screw mechanism, via a strain detector fixed to the cylindrical body; and
detecting an abnormality of the strain detector based on the value corresponding to the displacement, the value being detected in the detecting.

* * * * *